United States Patent [19]

Motomura et al.

[11] Patent Number: 5,267,133
[45] Date of Patent: Nov. 30, 1993

[54] SWITCHING POWER SOURCE

[75] Inventors: Hiroyuki Motomura; Koji Hisanaga; Mikinao Takizawa; Shigeo Miyazawa, all of Tokyo, Japan

[73] Assignee: NEC Corporation, Tokyo, Japan

[21] Appl. No.: 804,584

[22] Filed: Dec. 10, 1991

[30] Foreign Application Priority Data

Dec. 10, 1990 [JP] Japan .................. 2-409977

[51] Int. Cl.⁵ .................. G05F 1/614; H02M 3/335
[52] U.S. Cl. .................. 363/21; 363/97; 323/222; 323/351
[58] Field of Search .............. 323/282, 283, 284, 285, 323/222, 351; 363/127, 20, 21, 24, 25, 95, 97

[56] References Cited

U.S. PATENT DOCUMENTS

| | | | |
|---|---|---|---|
| 4,785,387 | 11/1988 | Lee et al. | 363/21 |
| 4,857,822 | 8/1989 | Tabisz et al. | 323/282 |
| 4,931,716 | 6/1990 | Jovanovic et al. | 323/285 |
| 5,066,900 | 11/1991 | Bassett | 323/224 |
| 5,140,512 | 8/1992 | O'Sullivan | 363/24 |
| 5,172,309 | 12/1992 | De Doncker et al. | 363/132 |

Primary Examiner—Steven L. Stephan
Assistant Examiner—Ben Davidson
Attorney, Agent, or Firm—Sughrue, Mion, Zinn, Macpeak & Seas

[57] ABSTRACT

A resonant type switching power source implementing zero voltage switching on the basis of the resonance between an inductor and a capacitor. A main switch is connected to the primary side of a main transformer. A pulse width control circuit generates a control signal for varying the turn-on time of the main switch until the output voltage of the secondary side of the tranformer being fed back reaches a predetermined value. A resonance capacitor is connected in parallel with the main switch. When the terminal voltage of the capacitor crosses zero potential toward the negative side, the pulse width control circuit delivers an ON command to the main switch. Alternatively, the ON control over the main switch may begin at a time a predetermined period of time later than the time for turning on the resonant circuit.

3 Claims, 5 Drawing Sheets

SWITCHING POWER SOURCE

BACKGROUND OF THE INVENTION

The present invention relates to a resonant type switching power source capable of implementing zero-voltage switching on the basis of the resonance between an inductor and a capacitor and, more particularly, to a partial voltage resonant converter incorporated in such a switching power source.

A resonant type switching power source which can be controlled by a fixed frequency is studied. This type of switching power source has a partial voltage resonant converter which partially oscillates only on the turn-on and turn-off of the switches. A resonant converter of this kind promotes high frequency operations by reducing switching losses, allows parts which are not strictly resistive to high voltages to be used due to the voltage clamping characteristic, and frees the fixed frequency control from considerations which traditional voltage resonant converters should give to frequency control. A specific construction of the partial voltage resonant converter is disclosed in, for example, "Electronic Technologies", Nikkan Kogyo Shimbun, March 1990, pp. 30-37.

However, the problem with the conventional partial voltage resonant converter is that the inductor for realizing zero-voltage switching is constituted by a main transformer with windings, resulting in a complicated and expensive transformer. Another problem is that a main switch and an auxiliary switch cannot have their potentials matched due to the particular circuit arrangement, i.e., without resorting to an exclusive transformer for driving the auxiliary switch, further increasing the cost.

SUMMARY OF THE INVENTION

It is, therefore, an object of the present invention to provide a switching power source capable of implementing zero-voltage switching with a simple circuit arrangement.

It is another object of the present invention to provide a generally improved switching power source.

A switching power source of the present invention comprises a main transformer, a main switch connected to the primary winding side of the main transformer, a pulse width control circuit for generating a control signal to vary the turn-on time of the main switch until the output voltage of the secondary winding side of the main transformer being fed back reaches a predetermined value, a capacitor connected in parallel with the main switch, an inductor connected in series with the capacitor via the junction of the capacitor and primary winding side of the main transformer, an auxiliary switch for selectively opening or closing the series connection of the inductor and capacitor in response to the control signal, a first diode connected in series with the main switch and rendered non-conductive when a voltage lower than zero voltage is applied to the first diode, a second diode connected in series with the auxiliary switch and rendered non-conductive when a voltage lower than zero voltage is applied to the second diode, and a control circuit for delaying the control signal to be applied from the pulse width control circuit to the main switch until the potential on the junction has been determined to be zero.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
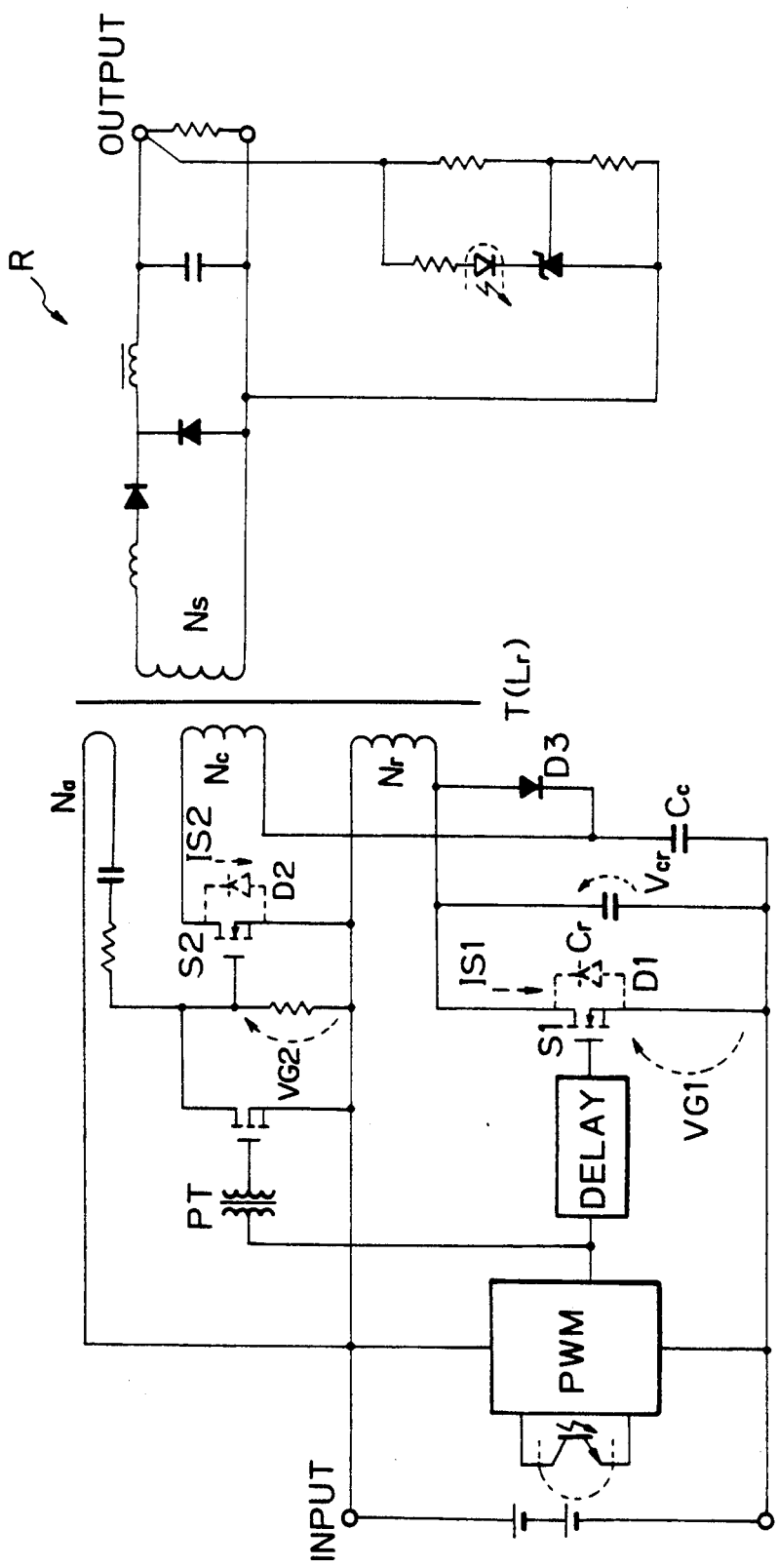
FIG. 1 is a circuit diagram showing a conventional partial voltage resonant converter.

To better understand the present invention, a brief reference will be made to a conventional switching power source, particularly a partial voltage resonant converter thereof, shown in FIG. 1. As shown, the partial voltage resonant converter is basically implemented as a separately excited converter using a forward converter. The converter has a main switch S1, an auxiliary switch S2, a transformer T consisting of a primary winding Nr, a clamp winding Nc, an auxiliary winding Na and a secondary winding Ns, a rectifying circuit R connected to the secondary side of the transformer T, parasitic diodes D1 and D2, a clamp diode D3, a capacitor Cr for resonance, a clamp capacitor Cc, a pulse width modulation circuit PWM, a delay circuit DELAY, and a pulse transformer PT.

Figure 2:
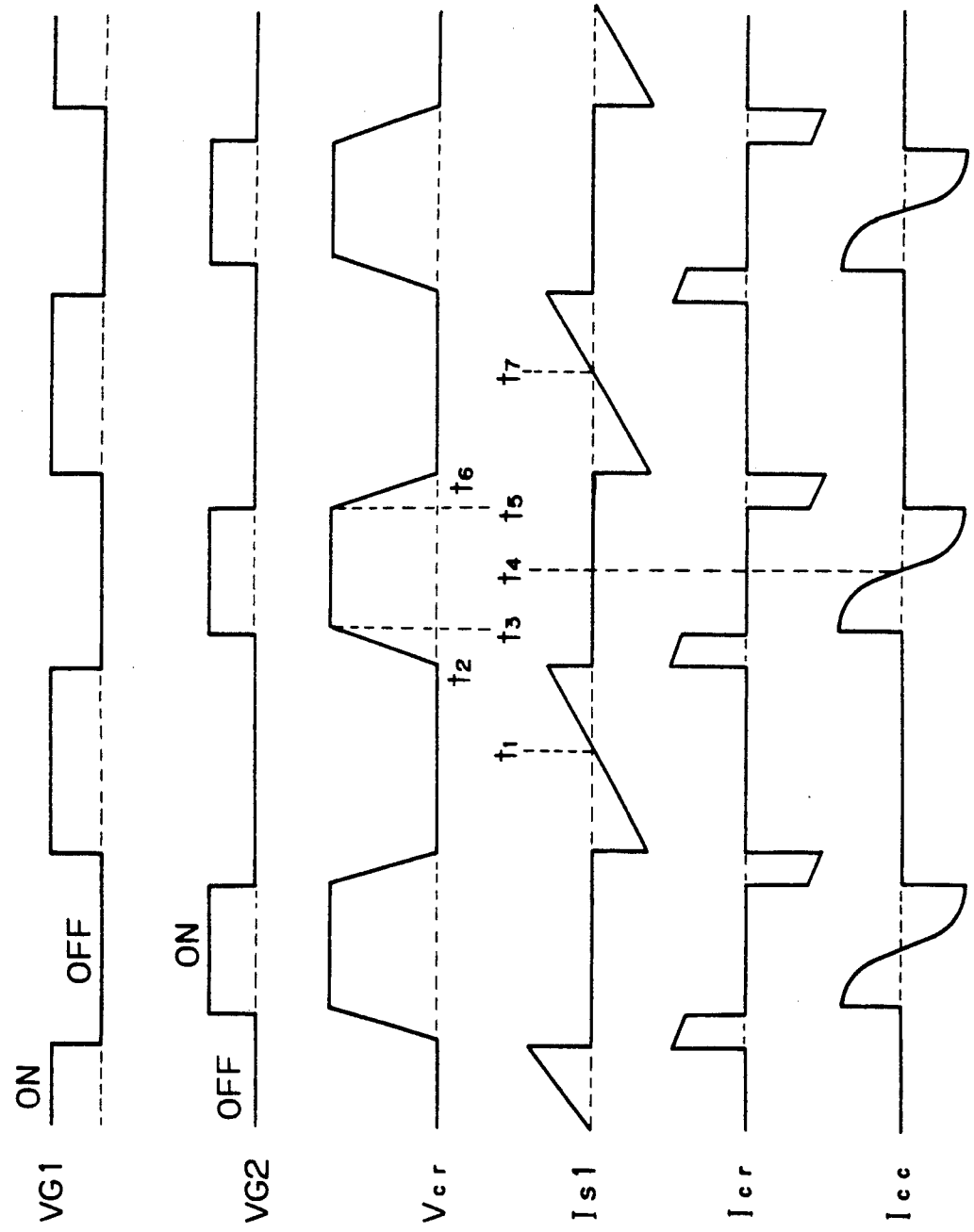
FIG. 2 shows the waveforms of voltages and current appearing in various sections of the conventional converter.

A reference will also be made to FIG. 2 for describing the operation of the conventional resonant converter under the heads of Modes 1-6.

(1) Mode 1 (time $t_1$-$t_2$): When the main switch S1 is turned on, an exciting current flows through the resonant inductor Lr which uses the leakage inductance Lr of the transformer T. The exiting current linearly increases.

(2) Mode 2 (time $t_2$-$t_3$): As the main switch S1 is turned off at the time $t_2$, the current IS1 having flown through the main switch S1 flows into the resonant capacitor Cr. As a result, the voltage Vcr of the capacitor Cr rises in a resisoidal fashion.

(3) Mode 3 (time $t_3$-$t_4$): When the voltage of the resonat capacitor Cr having been charged by the resonance current from the resonant inductor Lr, i.e., the voltage VG1 of the main witch S1 reaches the charge voltage of the clamp capacitor Cc, the clamp diode D3 is rendered conductive to clamp the voltage VG1 of the switch S1 at a constant value. A current also flows into the clamp capacitor Cc from the clamp winding Nc having the same number of turns as the primary winding Cr via the parasitic diode D2 of the auxiliary switch S2.

(4) Mode 4 (time $t_4$-$t_5$): When the auxiliary switch S2 is turned on before the currents flowing into the clap capacitor Cc via the parasitic diode D2 and clamp diode D3 fall to zero, the capacitor Cc is discharged by the voltage of the clamp winding Nc. Consequently, the charge having been stored in the clamp capacitor Cc over the period of time $t_3$-$t_4$ is returned to the input side via the clamp winding Nc.

(5) Mode 5 (time $t_5$-$t_6$): As the auxiliary switch S2 is turned off at a time $t_5$, the current having flown through the clamp capacitor Cc flows into the resonant inductor Lr with the result that resonance occurs between the inductor Lr and the capacitor Cr. Hence, the voltage of the capacitor Cr drops in a sinusoidal fashion.

(6) Mode 6 (time $t_6$-$t_7$): At the time $t_6$ when the discharge of the resonant capacitor Cr ends, the current having flown through the resonant inductor Lr flows into the parasitic diode D1 of the main switch S1. Since the voltage of the main switch S1 is zero during this period of time, the main switch S1 may be turned on to implement zero-voltage switching.

As stated above, the conventional capacitor for resonance has the auxiliary winding Na in the transformer and reversely excites the transformer T by the voltage stored in the clamp capacitor Cc and the auxiliary switch S2 to thereby lower the voltage of the main switch S1 to zero, i.e., to realize zero-voltage switching. However, the transformer T implementing the inductor is complicated in construction since it has four windings Nr, Nc, Na and Ns, as discussed earlier. In addition, the pulse transformer PT has to be connected to the auxiliary switch S2 since the main switch and the auxiliary switch S2 cannot have the potentials thereof matched due to the particular circuit arrangement, increasing the production cost.

Preferred embodiments of the present invention which are free from the above problems will be described hereinafter. In the embodiments, the same or similar components as the components of the conventional resonant converter described above are designated by the same reference characters and numerals, and redundant description will be avoided for simplicity.

Figure 3:
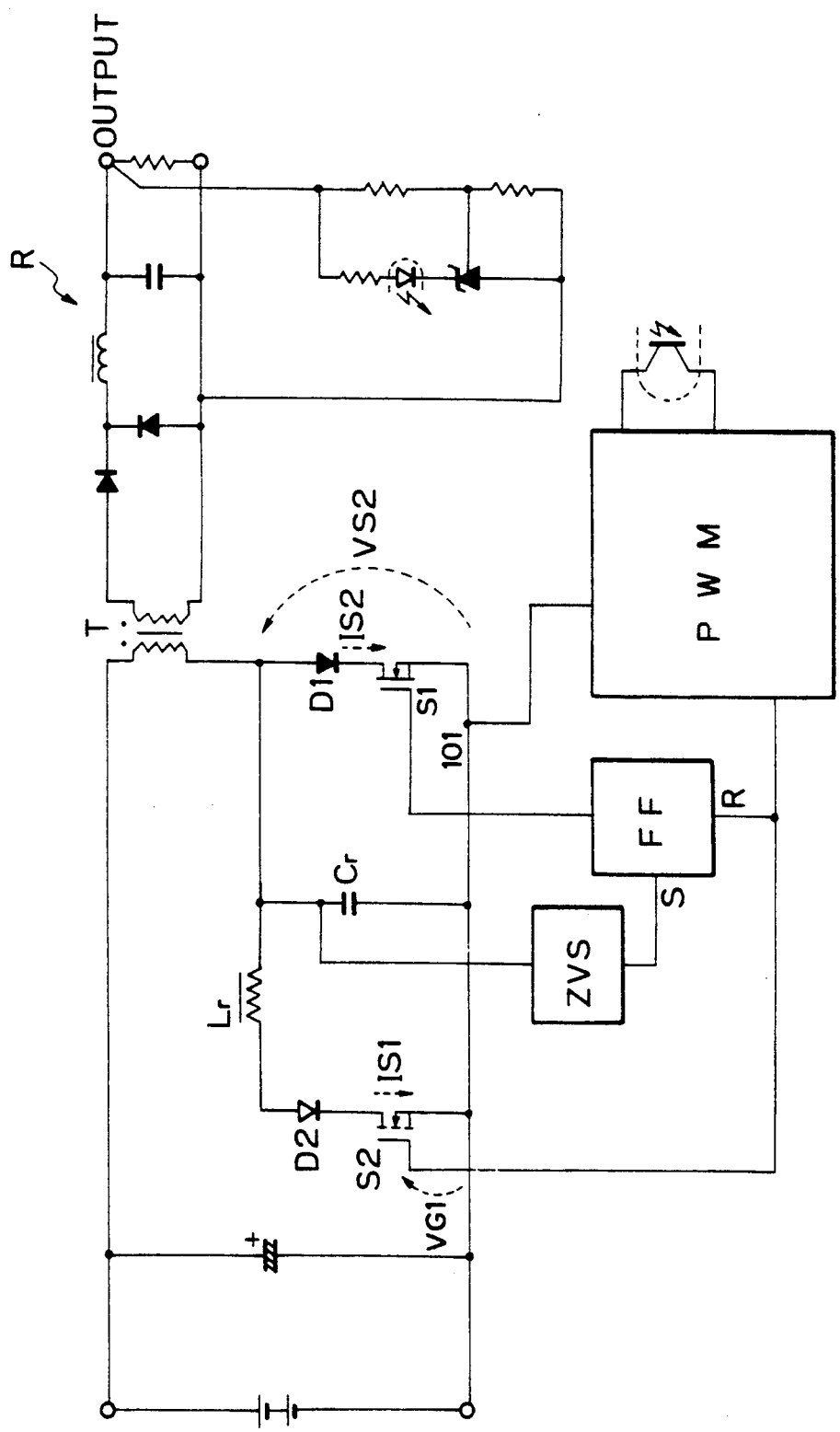
FIG. 3 is a circuit diagram showing a partial voltage resonant converter embodying the present invention.

Referring to FIG. 3, a partial voltage resonant converter embodying the present invention is shown and includes a main transformer T. A main switch S1 is inserted in the primary side of the main transformer T. A pulse width control circuit PWM generates a control signal for varying the duration of the on-state of the main switch S1 until the output voltage of the secondary side of the main transformer T being fed back reaches a predetermined value. A capacitor for resonance Cr is connected in parallel with the main switch S1. An inductor Lr for resonance is connected in series with the capacitor Cr via the junction of the capacitor Cr and the primary side of the main transformer T. An auxiliary switch S2 selectively opens or closes the series connection of the inductor Lr and capacitor Cr in response to the above-mentioned control signal. A diode D1 is connected in series with the main switch S1 and turned off when a voltage lower than zero voltage is applied to the switch S1. A diode D2 is connected in series with the auxiliary switch S2 and turned off when a voltage lower than zero voltage is applied to the switch S2. A zero voltage sensing circuit ZVS and a flip-flop FF constitute a control circuit for delaying the control signal to be fed from the pulse width control circuit PWM to the main switch S1, until it detects the drop of the potential on the above-mentioned junction to zero.

Figure 4:
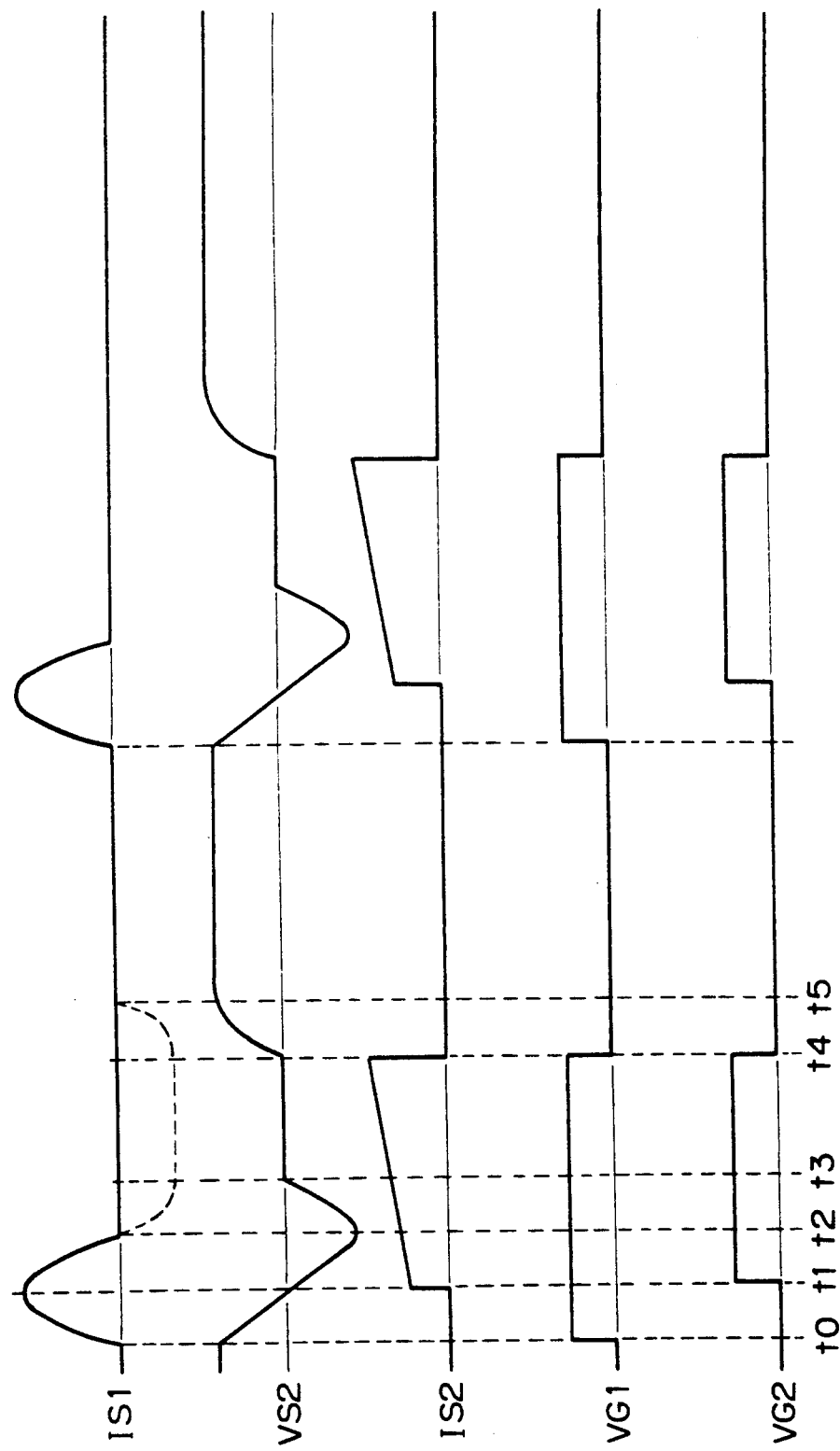
FIG. 4 is a shows the waveforms of voltages and currents appearing in various sections of the embodiment.

The operation of the embodiment will be described with reference to FIG. 4. When the auxiliary switch S2 turns on at a time $t_0$, the voltage across the resonant capacitor Cr sequentially decreases due to the resonance between the inductor Lr and the capacitor Cr. At a time $T_1$ when the current IS1 increases to the maximum value, the zero voltage sensing circuit ZVS senses zero voltage and then sends a signal to the flip-flop FF to turn on the main switch S1. At this instant, the main switch S1 should only be turned on while a negative voltage is applied ($t_1$-$t_3$), since the diode D1 is connected serially to the main switch S1. This, coupled with the fact that the gap between the times $t_0$ and $t_1$ is a constant substantially determined by the inductor Lr and capacitor Cr for resonance, allows the zero voltage sensing circuit ZVS and flip-flop FF to be replaced with a delay circuit which sets up a predetermined delay only when the drive pulse goes high. This kind of delay circuit is shown as an alternative embodiment in FIG. 5. This time gap, however, should preferably be as short as possible since the pulse width is uncontrollable throughout such a time gap. While the main switch S1 is in an on-state ($t_1$-$t_4$), a current having a rectangular waveform flows through the main switch S1. On the other hand, the auxiliary switch S2 may be turned off any time during the period of time $t_2$-$t_4$, i.e., while the main switch S1 is in an on-state. The rise of the output voltage is sensed by the zero voltage sensing circuit ZVS and then sent to the pulse width control circuit PWM via a photocoupler. As a result, both the main switch S1 and the auxiliary switch S2 are turned off at the time $t_4$. The current having flown through the auxiliary switch S2 just before the turn-off of the switches S1 and S2 begins to charge the capacitor Cr at the same time as the turn-off of the switches S1 and S2. Therefore, the voltages across the switches S1 and S2 are prevented from sharply changing, implementing zero-voltage switching.

Assume that the auxiliary resonance switching circuit is provided with a full-wave configuration. Then, when negative current flows through the resonant inductor Lr, the exiting energy accumulated in the inductor Lr while the main switch S1 is in an on-state is consumed by the switches S1 and S2 during the period of time $t_3$-$t_4$, degrading the efficiency. In light of this, the embodiment uses a half-wave configuration by connecting the diode D2 in series with the switch S2.

Figure 5:
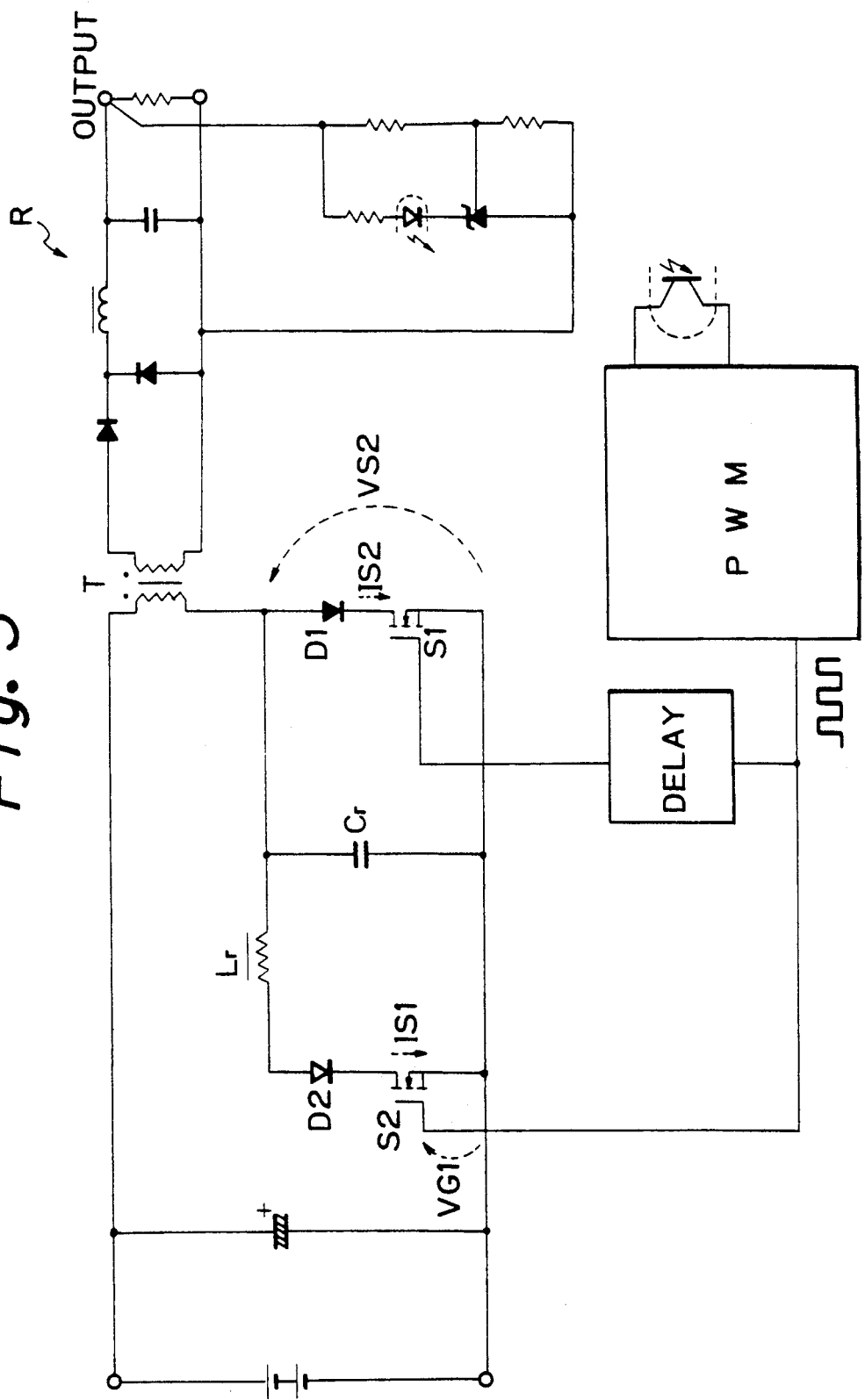
FIG. 5 is a circuit diagram representative of an alternative embodiment of the present invention.

FIG. 5 shows an alternative embodiment of the present invention in which a delay circuit DELAY is substituted for the zero voltage sensing circuit ZVS and flip-flop FF, as mentioned earlier. Specifically, the delay circuit DELAY sets up a predetermined or fixed delay only when the drive pulse goes high.

In summary, it will be seen that the present invention provides a switching power source having a main switch and an auxiliary switch serving as a zero-voltage switch and a zero-current switch, respectively, and thereby achieves various advantages, as enumerated below.

(1) A resonant device has a resonance frequency low enough to sufficiently reduce the delay of the main and auxiliary switches relative to the switching period. This allows the turn-on time of the main switch to be controlled on a pulse width basis and, therefore, allows the output voltage to be controlled without the switching frequency being changed.

(2) A switching power source with a minimum of noise is realized since the auxiliary switch causes the current to change little at the time of turn-on and turn-off and since the main switch causes the voltage to change little at the time of turn-on and turn-off. Further, since the voltage and current do not interlink during the transition of the switches, hardly any loss occurs despite the switching operations, implementing high frequency operations.

(3) The voltage applied to the main switch has a trapezoidal waveform in place of a fully sinusoidal waveform. The switches, therefore, doe not have to resist high voltages and can be implemented as inexpensive parts. When use is made of field effect transistors as the switches, the resistance on the turn-on of the switches is reduced.

(4) The loads acting on the parts associated with the auxiliary switch are far smaller than the loads which would be exerted on a resonant power source using a fully sinusoidal voltage or current, contributing to the cut-down of cost.

(5) The voltages for controlling the main and auxiliary switches are based on the same potential and, therefore, eliminates the need for an insulation transformer. This is successful in implementing an inexpensive drive circuit.

Various modifications will become possible for those skilled in the art after receiving the teachings of the present disclosure without departing from the scope thereof.

What is claimed is:

1. A switching power source comprising:
   a main transformer;
   a main switch connected to the primary winding side of said main transformer;
   a pulse width control circuit for generating a control signal to vary a turn-on time of said main switch until a feed back value from an output voltage of a secondary winding side of said main transformer reaches a predetermined value;
   a capacitor connected in parallel with said main switch;
   an inductor connected in series with said capacitor via a junction of said capacitor and said primary winding side of said main transformer;
   an auxiliary switch for selectively opening or closing the series connection of said inductor and said capacitor in response to said control signal, and for causing a resonant waveform to occur only around the ON and OFF states;
   a first diode connected in series with said main switch and rendered non-conductive when a voltage lower than zero voltage is applied to said first diode;
   a second diode connected in series with said auxiliary switch and rendered non-conductive when a voltage lower than zero voltage is applied to said second diode; and
   control means for delaying said control signal to be applied from said pulse width control circuit to said main switch until a potential on said junction has been determined to be zero.

2. A switching power source as claimed in claim 1, wherein said control means comprises a zero voltage sensing circuit and a flip-flop.

3. A switching power source as claimed in claim 1, wherein said control means comprises a delay circuit for delaying said control signal to be applied to said main switch by a predetermined period of time relative to said control signal to be applied to said auxiliary switch.

* * * * *